(12) United States Patent
Regan (10) Patent No.: US 6,324,451 B1
(45) Date of Patent: Nov. 27, 2001

(54) DETECTION OF THE PRESENCE OF A CONVERTIBLE TOP USING COMPASS ELECTRONICS

(75) Inventor: Patrick M Regan, White Lake, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/586,686

(22) Filed: Jun. 1, 2000

(51) Int. Cl.[7] ................................ H04B 1/00; G06F 7/00
(52) U.S. Cl. ................................................ 701/36; 381/86
(58) Field of Search .................... 701/36, 49; 381/86; 307/10.1

(56) References Cited

U.S. PATENT DOCUMENTS

| | | |
|---|---|---|
| 4,720,992 | 1/1988 | Hormel . |
| 5,208,483 * | 5/1993 | Reneau ................................. 307/10.1 |
| 5,208,866 * | 5/1993 | Kato et al. ............................ 381/107 |
| 5,225,747 * | 7/1993 | Helms et al. ......................... 318/265 |
| 5,297,065 | 3/1994 | Cage et al. . |
| 5,483,692 * | 1/1996 | Person et al. ...................... 455/238.1 |
| 5,550,992 * | 8/1996 | Becker .................................. 381/57 |
| 5,677,960 | 10/1997 | Unno et al. . |
| 5,680,468 * | 10/1997 | Van Hout et al. ..................... 381/86 |
| 5,950,722 | 9/1999 | Huetteman . |

* cited by examiner

*Primary Examiner*—Michael J. Zanelli
*Assistant Examiner*—Eric M Gibson
(74) *Attorney, Agent, or Firm*—Mark P Calcaterra (57) ABSTRACT

A convertible top position sensing system uses rear view mirror mounted compass electronics to detect the position of a convertible top. The sensing system includes a measurement device for measuring a magnetic field intensity, and a filtering module for filtering an artificial magnetic field intensity from the measured magnetic field intensity. The artificial magnetic field intensity is produced by the convertible top. A processing module determines a convertible top position based on the artificial magnetic field intensity. Magnetic field variance information is used in filtering the artificial magnetic field intensity from the measured magnetic field intensity. The sensing system is used in a sound control system for a convertible top vehicle, where a body control module adjusts a radio output parameter such as volume or equalization based on the convertible top position. Using pre-existing compass electronics eliminates the need for additional top position switching components.

26 Claims, 6 Drawing Sheets

DETECTION OF THE PRESENCE OF A CONVERTIBLE TOP USING COMPASS ELECTRONICS

BACKGROUND OF THE INVENTION

1. Field of the Invention

The present invention relates generally to determining the position of an automotive convertible top. More particularly, the present invention relates to a sensing system for determining a convertible top position based on magnetic field intensity and automatically adjusting a radio output parameter based on the convertible top position.

2. Discussion

In the automotive industry, a particularly popular luxury item is the convertible top. The ability of convertible tops to provide passengers with natural sunlight has always been a unique alternative to hard top vehicles. It is not surprising, however, that convertibles have a number of design considerations not encountered with conventional hard top automobiles. For example, it is commonly accepted that radio volume needs to be adjusted in accordance with the position of the convertible top. This requirement is mainly due to the fact that ambient noise and wind make it more difficult for passengers to hear the radio when the top is down.

Some automotive body control modules have addressed this concern by adding an operator selectable relay or switch to the vehicle and providing two separate volume and equalization curves for the radio. Thus, when the switch is positioned to indicate that the convertible top is in the down position, the body control module (BCM) selects the top down curve, which has a higher output level and equalization profile over the frequency spectrum of interest. When the operator positions the switch to indicate that the convertible top is in the up position, the top up curve is selected.

A difficulty with the above approach is the added cost to the vehicle associated with the position sensing switch and related circuitry and wiring. This additional cost substantially increases the overall cost of the vehicle, and has traditionally reduced convertible sales. It is therefore desirable to provide a mechanism for determining a convertible top position which does not significantly add to the overall cost of the vehicle.

Reliability concerns also accompany mechanical switches. In fact, it is not uncommon for convertible top switches and relays to require substantial alignment and positioning adjustments during both manufacturing as well as maintenance. It is therefore desirable to reduce error due to an increased number of parts.

Another design consideration associated with convertibles is drive control of the convertible top. For example, the motorized drive electronics must be able to determine when the top has reached the fully up or fully down position. Once again, under conventional approaches, switching circuitry has been placed in the vehicle to provide position information for control purposes. Such an approach is often ineffective and prone to device failures. It is therefore desirable to provide an effective mechanism for controlling movement of convertible tops.

SUMMARY OF THE INVENTION

In accordance with the present invention, a sound control system for a convertible top vehicle uses the convertible top to produce an artificial magnetic field intensity. A sensing system determines the convertible top position based on the artificial magnetic field intensity, and a body control module adjusts a radio output parameter based on the convertible top position. In a preferred embodiment of the invention, the sensing system is mounted in the rear view mirror and makes use of pre-existing trip computer compass electronics. Thus, additional switching circuitry is not needed.

In another aspect of the invention, a convertible top position sensing system includes a measurement device for measuring a magnetic field intensity, and a filtering module for filtering an artificial magnetic field intensity from the measured magnetic field intensity. The artificial magnetic field intensity results from the convertible top. A processing module determines a convertible top position based on the artificial magnetic field intensity.

The present invention also provides a method for determining a position of a vehicle convertible top. The method includes the steps of measuring a magnetic field intensity, and filtering an artificial magnetic field intensity from the measured magnetic field intensity. The artificial magnetic field intensity results from the convertible top. The method further provides for determining a convertible top position based on the artificial magnetic field intensity.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The invention is set forth in exemplary fashion by the following detailed description of a preferred embodiment taken in conjunction with the drawings, in which.

DETAILED DESCRIPTION OF THE PREFERRED EMBODIMENT

Figure 1:
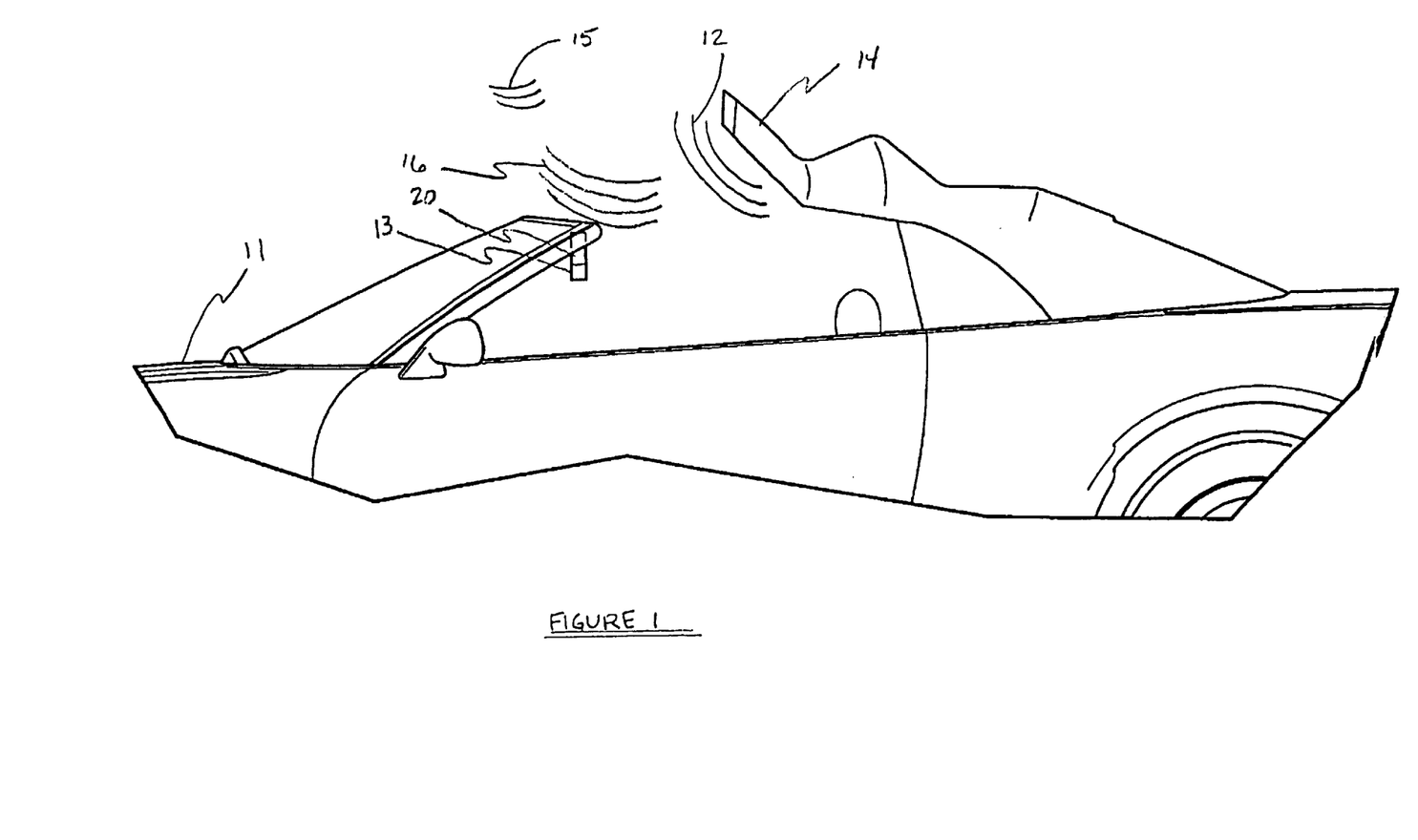
FIG. 1 is a side view of a convertible top vehicle with a sound control system according to the present invention.

FIG. 1 shows a convertible top automobile 11 incorporating a sound control system in accordance with the present invention. As will be discussed in greater detail, the sound control system includes a sensing system 20 for determining the convertible top position based on an artificial magnetic field intensity 12. Preferably, the sensing system 20 is mounted in a rear view mirror 13 and utilizes pre-existing compass electronics well known in the art. The artificial magnetic field intensity 12 is produced by convertible top 14, whereas a natural magnetic field intensity 15 is produced by the earth's magnetic properties and surrounding structures. The sensing system 20 of the present invention therefore filters the artificial magnetic field intensity 12 from a measured magnetic field intensity 16.

Figure 2:
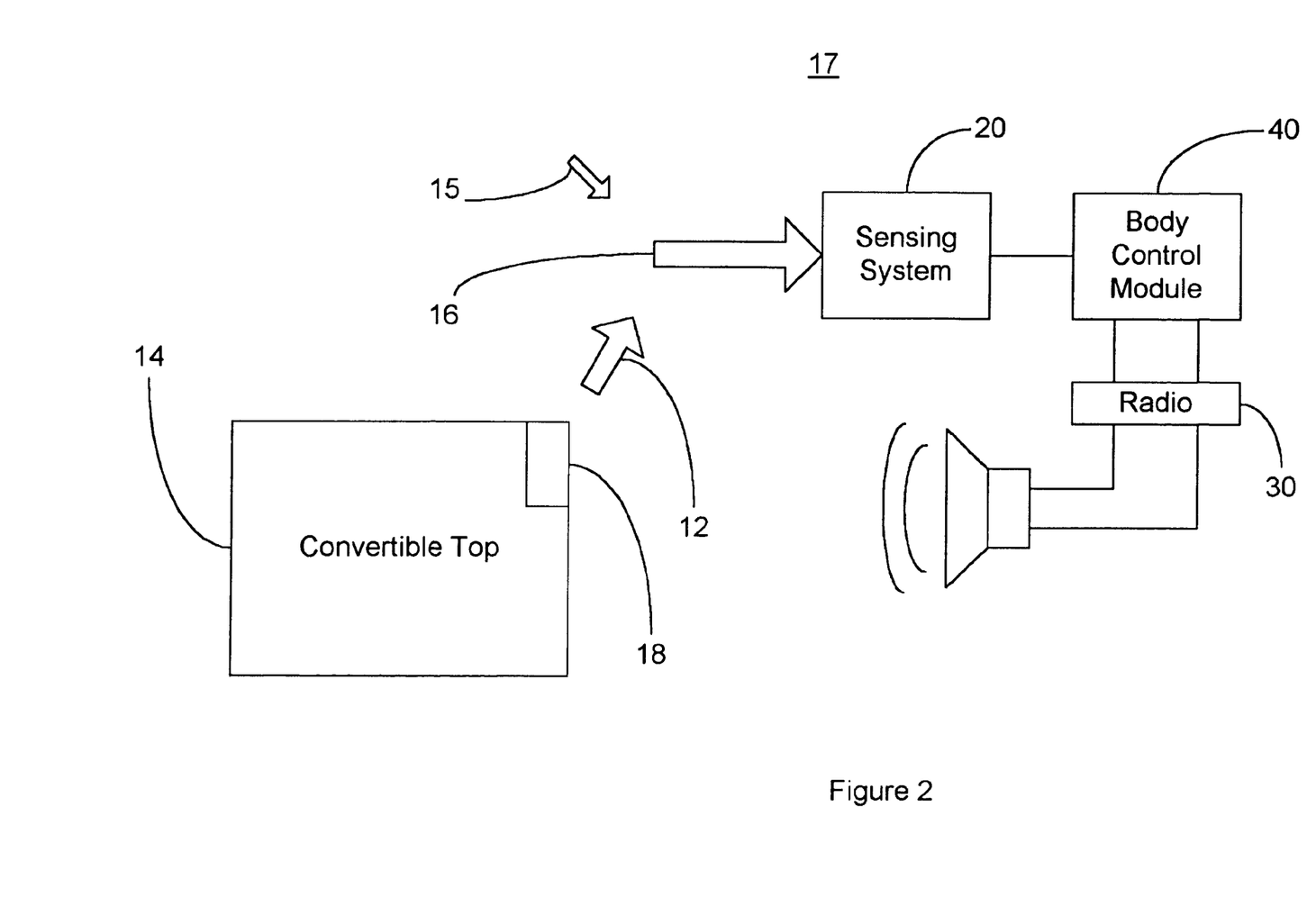
FIG. 2 is a block diagram of a sound control system according to the present invention.

Turning now to FIG. 2, operation of the preferred sound control system 17 is shown. Sound control system 17 includes a convertible top 14 for producing the artificial magnetic field intensity 12, and a sensing system 20 for determining a convertible top position based on the artificial magnetic field intensity 12. A body control module 40 adjusts a radio output parameter such as volume or equalization via radio 30 based on the convertible top position.

Figure 3:
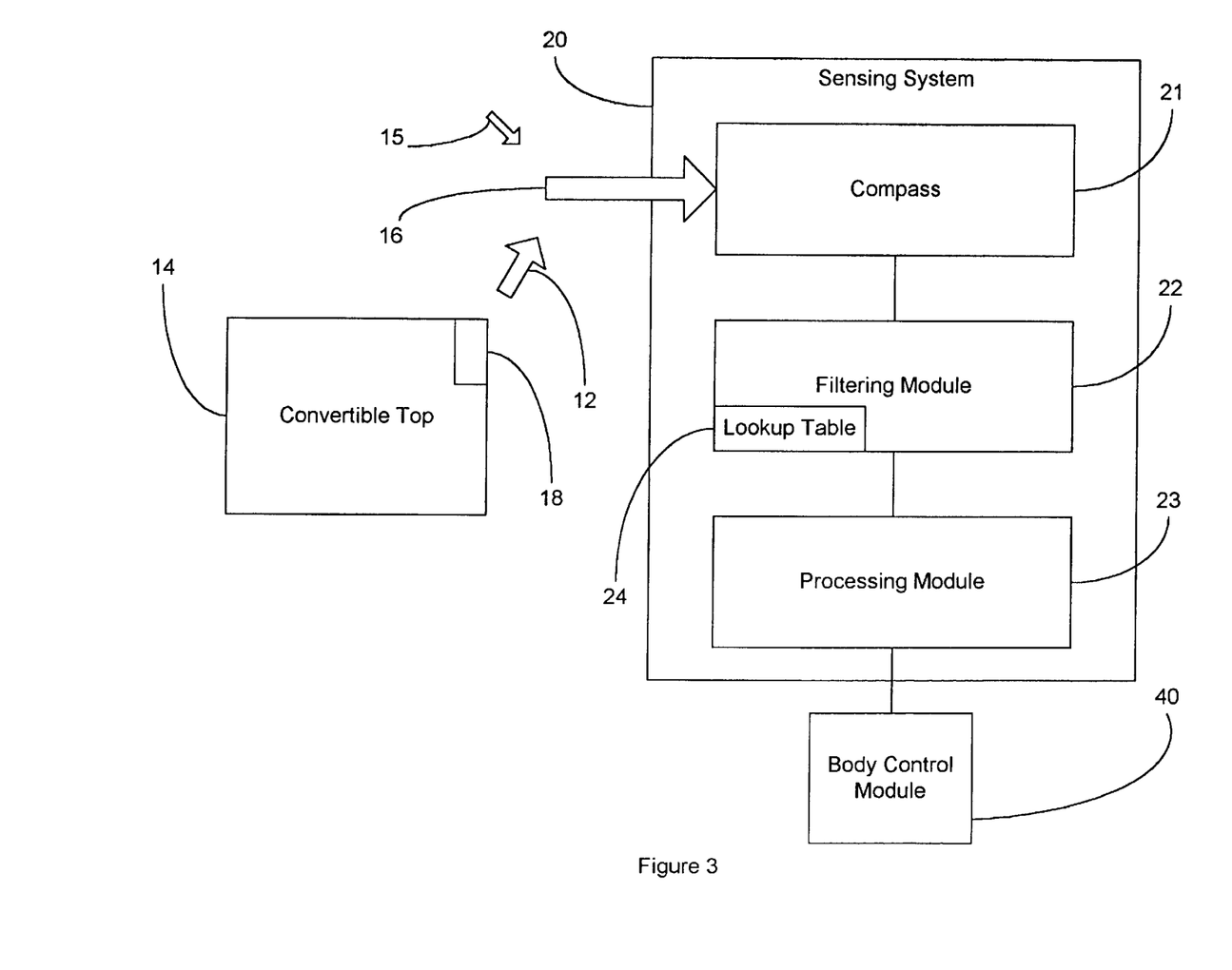
FIG. 3 is a block diagram of a convertible top position sensing system according to a preferred embodiment of the present invention.

Turning now to FIG. 3, the preferred sensing system 20 is shown in greater detail. It will be appreciated that sensing system 20 includes a compass 21 for measuring the magnetic field intensity 16, and a filtering module 22 for filtering the artificial magnetic field intensity 12 from the measured magnetic field intensity 16. A processing module 23 determines the convertible top position based on the artificial magnetic field intensity 12. Compass 21 includes well-known electronics for measurement of magnetic field intensities and generation of a corresponding analog voltage. For example, a magneto resistive circuit (now shown) with the appropriate sensitivity can operate in conjunction with an ASIC (not shown) to produce a highly reliable analog signal. Preferably, the filtering module 22 determines a natural magnetic field intensity 15, and determines the artificial magnetic field intensity 12 based on the natural magnetic field intensity 15 and the measured magnetic field intensity 16. Thus, filtering module 22 includes a filtering lookup table 24 containing data representing magnetic field variance information, such that the filtering module 22 determines the natural magnetic field intensity 15 based on the variance information. The variance information is preferably geographically dependant and is well known in the art. Filtering look-up table 24 can be stored in any appropriate computer readable memory such as RAM or ROM. Filtering module 22 and processing module 23 can be implemented via any suitable microprocessor such as any one of the Motorola MC68000 series microprocessors.

Figure 4:
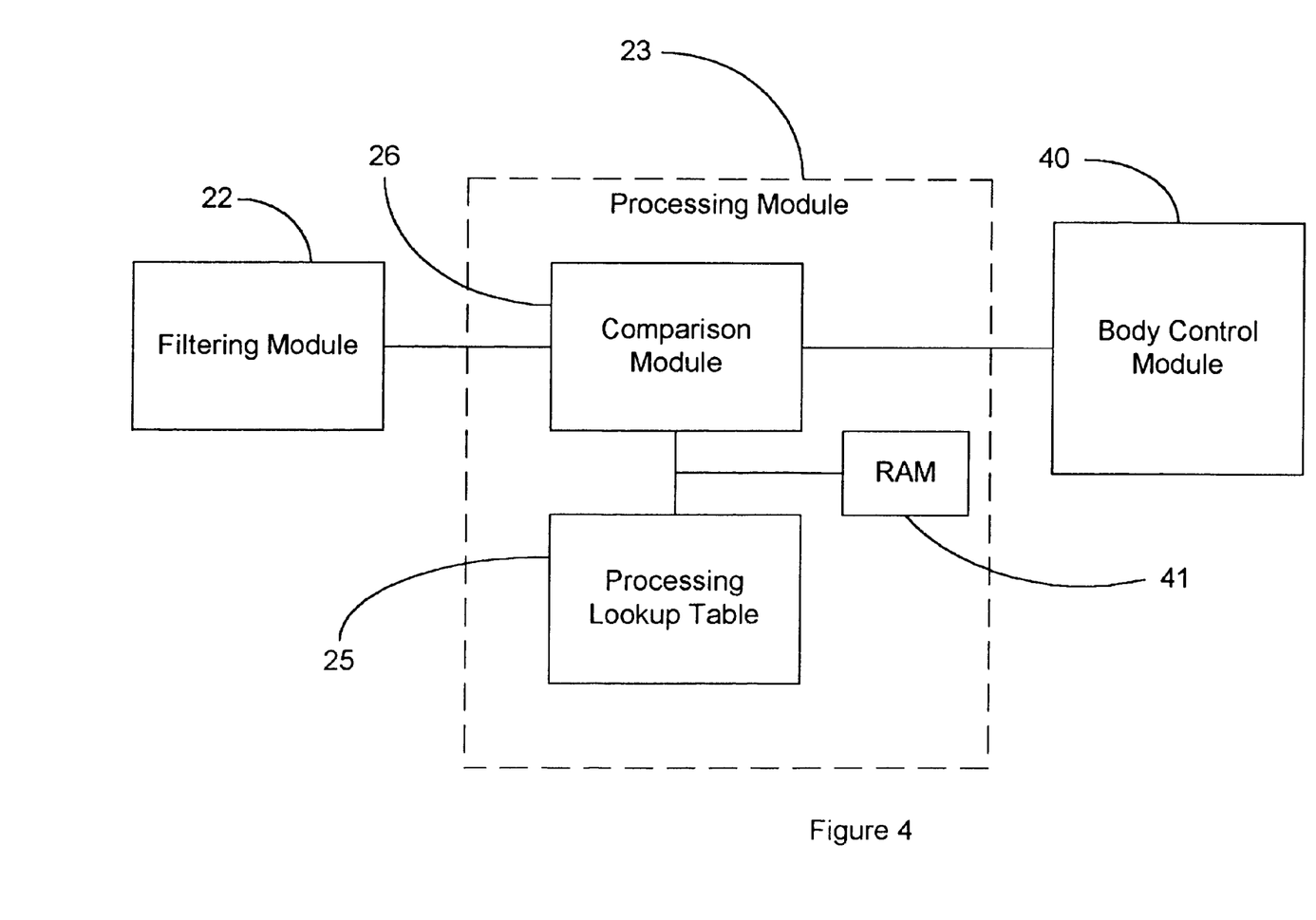
FIG. 4 is a block diagram of a processing module according to the present invention.

FIG. 4 shows the preferred processing module 23 of sensing system 20 in greater detail. It will be appreciated that processing module 23 includes a processing look-up table 25 containing data representing a known magnetic field intensity. It will be appreciated that the known magnetic field intensity corresponds to a known top position. The processing module 23 retrieves the known magnetic field intensity from the processing look-up table 25. Thus, when the convertible top is in a known top position, a known magnetic field intensity will be produced. A comparison module 26 compares the artificial magnetic field intensity to the known magnetic field intensity. For example, when the artificial magnetic field intensity equals the intensity that the convertible top is known to produce when in the up position, the comparison module 26 will set the top up bit in RAM 41. Returning to FIG. 2, it can be seen that the convertible top 14 may include a magnetic identification material, such as magnetic tape 18 for producing the artificial magnetic field intensity 12. For example, magnetic tape 18 could be necessary if the frame of the convertible top 14 is made of a composite material with weak or no magnetic properties. If the frame of top 14 is made of metal, however, magnetic tape 18 is not required. It will be appreciated that the body control module 40 selects a top up curve for the radio output parameter when the convertible top 14 is in an up position, and selects a top down curve when the convertible top 14 is in the down position.

Figure 5:
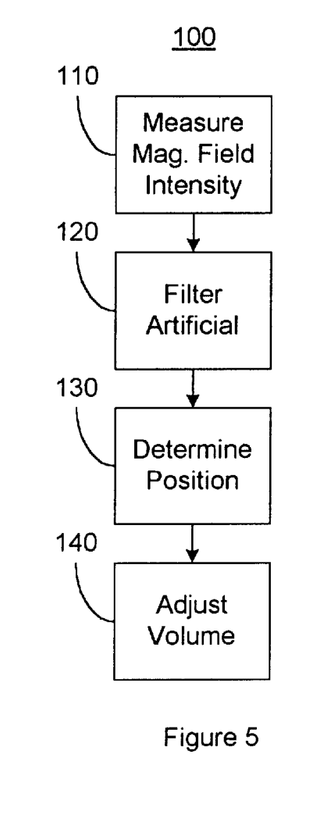
FIG. 5 is a flowchart of a method for determining a position of a vehicle convertible top according to the present invention.

Turning now to FIG. 5, a method 100 for determining a position of a vehicle convertible top is shown for programming purposes. Generally, the method 100 includes the step 110 of measuring a magnetic field intensity, and step 120 of filtering an artificial magnetic field intensity from the measured magnetic field intensity. As already discussed, the artificial magnetic field intensity results from the convertible top. At step 130 a convertible top position is determined based on the artificial magnetic field intensity. Preferably, a radio output parameter such as volume is adjusted at step 140 based on the convertible top position.

Figure 6:
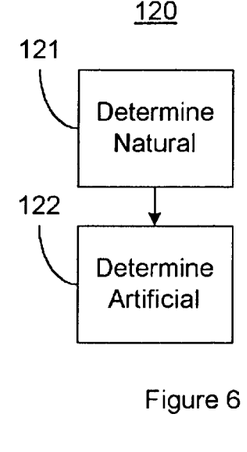
FIG. 6 is a flowchart of a process for filtering an artificial magnetic field intensity from a measured magnetic field intensity.

FIG. 6 shows filtering step 120 in greater detail. It will be appreciated that at step 121 a natural magnetic field intensity is determined, and at step 122 the artificial magnetic field intensity is determined based on the natural magnetic field intensity and the measured magnetic field intensity.

Figure 7:
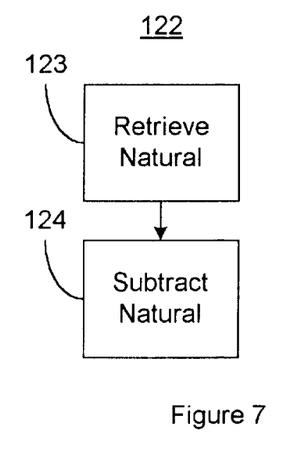
FIG. 7 is a flowchart of a process for determining an artificial magnetic field intensity according to the present invention.

Turning now to FIG. 7, it will be appreciated that the artificial magnetic field intensity is determined by retrieving the natural magnetic field intensity from a magnetic field variance chart at step 123. At step 124 the natural magnetic field intensity is subtracted from the measured magnetic field intensity. It is important to note that the earth generates relatively small natural magnetic field intensities as compared to the artificial magnetic field intensities generated by convertible tops. Typical measured magnetic field intensities have been found to be approximately 60 mili gauss when the convertible top is in the up position.

Figure 8:
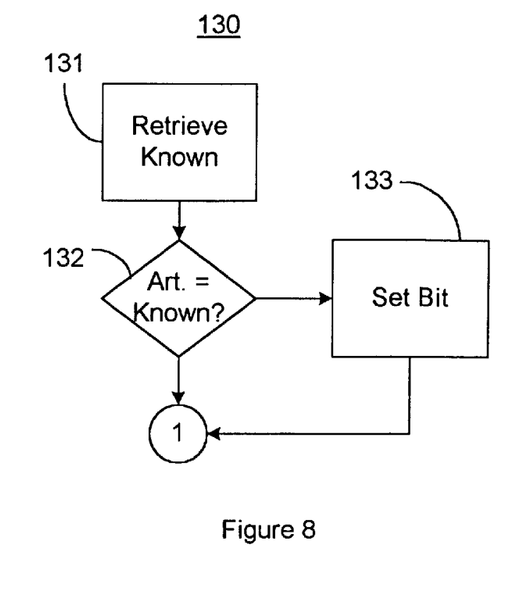
FIG. 8 is a flowchart of a process for determining a convertible top position based on an artificial magnetic field intensity according to the present invention.

FIG. 8 shows a preferred approach to determining the convertible top position. Specifically, it can be seen that at step 131 a known magnetic field intensity is retrieved, where the known magnetic field intensity corresponds to a known top position. The artificial magnetic field intensity is compared to the known magnetic field intensity at step 132. This step reveals whether the convertible top is at the known top position. If so, the convertible top position is stored to a computer readable memory by setting the appropriate bit at step 133. Thus, if the known magnetic field intensity corresponds to the top up position, then the top up bit will be set in the computer readable memory when the convertible top is in the up position.

Figure 9:
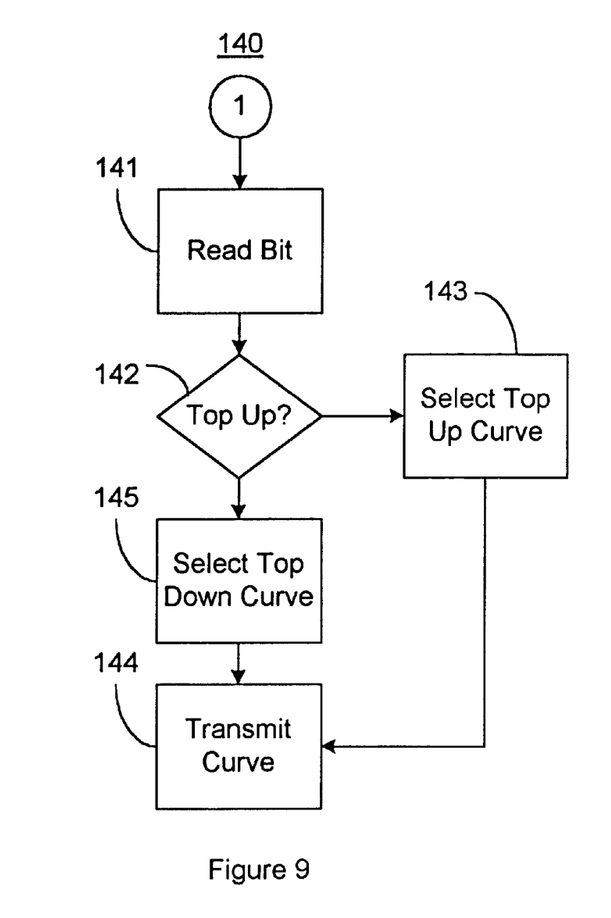
FIG. 9 is a flowchart of a process for adjusting a radio volume based on a convertible top position according to the present invention.

FIG. 9 demonstrates a preferred approach to adjusting the radio volume based on the convertible top position. It will be appreciated that at step 141 the appropriate bit is read from memory. At step 142 it is determined whether the top is in the up position. If so, the top up curve is selected at step 143 and transmitted to the radio signal processing system at step 144. If it is determined at step 142 that the top is not in the up position, the top down curve is selected at step 145. Thus, radio output parameters such as volume can be made to be a function of the convertible top position without adding switches, etc.

Figure 10:
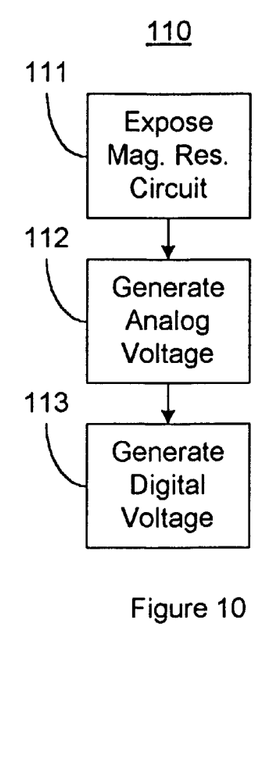
FIG. 10 is a flowchart of a process for measuring a magnetic field intensity.

Turning now to FIG. 10, the process of measuring the magnetic field intensity is shown in greater detail. Specifically, a magneto resistive circuit is exposed to the magnetic field at step 111, and a measurement voltage representing the intensity of the magnetic field is generated. Thus, at step 112 an analog measurement voltage representing the measured magnetic field intensity is generated, and a digital measurement voltage is generated at step 113 based on the analog measurement voltage.

While the above description constitutes the preferred embodiment of the invention, it will be appreciated that the invention is susceptible to modification, variation, and change without departing from the proper scope or full meaning of the accompanying claims.

What is claimed is:

1. A sound control system for a convertible top vehicle, the control system comprising:
   a convertible top for producing an artificial magnetic field intensity;
   a sensing system for determining a convertible top position based on the artificial magnetic field intensity; and
   a body control module for adjusting a radio output parameter based on the convertible top position.

2. The control system of claim 1 wherein the sensing system is mounted in a rear view mirror.

3. The control system of claim 1 wherein the sensing system includes:
   a compass for measuring a magnetic field intensity;
   a filtering module for filtering the artificial magnetic field intensity from the measured magnetic field intensity; and
   a processing module for determining the convertible top position based on the artificial magnetic field intensity.

4. The control system of claim 3 wherein the filtering module determines a natural magnetic field intensity, and determines the artificial magnetic field intensity based on the natural magnetic field intensity and the measured magnetic field intensity.

5. The control system of claim 4 wherein the filtering module includes a filtering lookup table containing data representing magnetic field variance information, the filtering module determining the natural magnetic field intensity based on the variance information.

6. The control system of claim 3 wherein the processing module includes:
   a processing lookup table containing data representing a known magnetic field intensity, the processing module retrieving the known magnetic field intensity from the processing lookup table, the known magnetic field intensity corresponding to a known top position; and
   a comparison module for comparing the artificial magnetic field intensity to the known magnetic field intensity.

7. The control system of claim 1 wherein the convertible top includes a magnetic identification material for producing the artificial magnetic field intensity.

8. The control system of claim 7 wherein the magnetic identification material is magnetic tape.

9. The control system of claim 1 wherein the body control module selects a top up curve for the radio output parameter when the convertible top is in an up position.

10. The control system of claim 1 wherein the body control module selects a top down curve for the radio output parameter when the convertible top is in a down position.

11. A convertible top position sensing system comprising:
    a measurement device for measuring a magnetic field intensity;
    a filtering module for filtering an artificial magnetic field intensity from the measured magnetic field intensity, the artificial magnetic field intensity resulting from the convertible top; and
    a processing module for determining a convertible top position based on the artificial magnetic field intensity.

12. The sensing system of claim 11 wherein the filtering module determines a natural magnetic field intensity, and determines the artificial magnetic field intensity based on the natural magnetic field intensity and the measured magnetic field intensity.

13. The sensing system of claim 12 wherein the filtering module includes a filtering lookup table containing data representing magnetic field variance information, the filtering module determining the natural magnetic field intensity based on the variance information.

14. The sensing system of claim 11 wherein the processing module includes:
    a processing lookup table containing data representing a known magnetic field intensity, the processing module retrieving the known magnetic field intensity from the processing lookup table, the known magnetic field intensity corresponding to a known top position; and
    a comparison module for comparing the artificial magnetic field intensity to the known magnetic field intensity.

15. The sensing system of claim 14 wherein the comparison module sets a top up bit in a computer readable memory when the convertible top is in an up position.

16. The sensing system of claim 11 wherein the measuring device is a compass.

17. A method for determining a position of a vehicle convertible top, the method comprising the steps of:
    measuring a magnetic field intensity;
    filtering an artificial magnetic field intensity from the measured magnetic field intensity, the artificial magnetic field intensity resulting from the convertible top; and
    determining a convertible top position based on the artificial magnetic field intensity.

18. The method of claim 17 further including the steps of:
    determining a natural magnetic field intensity; and
    determining the artificial magnetic field intensity based on the natural magnetic field intensity and the measured magnetic field intensity.

19. The method of claim 18 further including the step of retrieving the natural magnetic field intensity from a magnetic field variance chart.

20. The method of claim 18 further including the step of subtracting the natural magnetic field intensity from the measured magnetic field intensity.

21. The method of claim 17 further including the step of adjusting a radio volume based on the convertible top position.

22. The method of claim 17 further including the steps of:
    retrieving a known magnetic field intensity, the known magnetic field intensity corresponding to a known top position; and
    comparing the artificial magnetic field intensity to the known magnetic field intensity.

23. The method of claim 22 further including the step of storing the convertible top position to a computer readable memory.

24. The method of claim 23 further including the step of setting a top up bit in the computer readable memory when the convertible top is in an up position.

25. The method of claim 17 further comprising the steps of:

exposing a magneto resistive circuit to a magnetic field; and generating a measurement voltage representing an intensity of the magnetic field.

26. The method of claim 25 further comprising the steps of:

generating an analog measurement voltage representing the measured magnetic field intensity; and generating a digital measurement voltage based on the analog measurement voltage.

* * * * *